US008126693B2

(12) United States Patent
Arnold et al.

(10) Patent No.: US 8,126,693 B2
(45) Date of Patent: *Feb. 28, 2012

(54) METHOD AND SYSTEM FOR MODELING, VALIDATING AND AUTOMATICALLY RESOLVING GOALS AND DEPENDENCIES BETWEEN ELEMENTS WITHIN A TOPOLOGY

(75) Inventors: William Carlisle Arnold, Mahopac, NY (US); Daniel Christopher Berg, Holly Springs, NC (US); Brad Lee Blancett, Raleigh, NC (US); Tamar Eilam, New York, NY (US); Michael Damein Elder, Durham, NC (US); Chad M. Holliday, Holly Springs, NC (US); Michael Husayn Kalantar, Chapel Hill, NC (US); Alexander V. Konstantinou, New York, NY (US); Narinder Makin, Morrisville, NC (US); Edward Charles Snible, Bronx, NY (US); John Eric Swanke, Terryville, CT (US); Andrew Neil Trossman, North York (CA); Paul Darius Vytas, Toronto (CA); Alice Tse Yun Yeung, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 616 days.

This patent is subject to a terminal disclaimer.

(21) Appl. No.: 12/014,624

(22) Filed: Jan. 15, 2008

(65) Prior Publication Data
US 2009/0183021 A1     Jul. 16, 2009

(51) Int. Cl.
*G06F 17/50*     (2006.01)
(52) U.S. Cl. ............................. 703/13; 703/21; 709/220

(58) Field of Classification Search .................... 703/13, 703/1, 15, 22, 21; 709/224, 203; 707/102, 707/100; 717/168; 714/16, 25; 710/1; 715/723
See application file for complete search history.

(56) References Cited

U.S. PATENT DOCUMENTS
6,002,854 A * 12/1999 Lynch et al. ..................... 703/1
(Continued)

OTHER PUBLICATIONS

Dullea et al., "An Analysis of Cardinality Constraints in Redundant Relationships", Proceedings of the 6th International Conference on Information and Knowledge Management, CIKM'97, Nov. 1997, pp. 270-277.

(Continued)

*Primary Examiner* — Kandasamy Thangavelu
(74) *Attorney, Agent, or Firm* — Yee & Associates, P.C.; Preston Young

(57) ABSTRACT

Computer implemented method, system and computer usable program code for configuring a computing system. A system for configuring a computing system includes a mechanism for creating a model of a computing system, a validator for determining whether there are any errors in the model, and a resolver, responsive to determining that there is at least one error in the model, for determining whether there is at least one resolution for correcting the at least one error. A selector, responsive to determining that there is at least one resolution for correcting the at least one error, selects at least one resolution among the at least one resolution for correcting the at least one error to form at least one selected resolution to correct the at least one error, and applies the at least one selected resolution to the model to form a transformed model. An output outputs the transformed model to a user.

20 Claims, 15 Drawing Sheets

U.S. PATENT DOCUMENTS

| | | | |
|---|---|---|---|
| 6,678,882 B1 | 1/2004 | Hurley et al. | |
| 7,188,335 B1 | 3/2007 | Darr et al. | |
| 2003/0212784 A1* | 11/2003 | Nguyen | 709/224 |
| 2004/0039561 A1* | 2/2004 | Montano et al. | 703/22 |
| 2006/0010258 A1* | 1/2006 | Zare et al. | 710/1 |
| 2006/0242171 A1* | 10/2006 | Tsyganskiy et al. | 707/100 |
| 2007/0043992 A1 | 2/2007 | Stevenson et al. | |
| 2007/0214173 A1* | 9/2007 | Ohashi et al. | 707/102 |
| 2007/0233448 A1* | 10/2007 | Papaefstathiou et al. | 703/15 |
| 2007/0294342 A1* | 12/2007 | Shah et al. | 709/203 |
| 2008/0010597 A1* | 1/2008 | Seemann et al. | 715/723 |
| 2008/0172574 A1* | 7/2008 | Fisher | 714/25 |
| 2008/0262823 A1* | 10/2008 | Oslake et al. | 703/22 |
| 2009/0113407 A1* | 4/2009 | Sedukhin et al. | 717/168 |
| 2009/0183028 A1* | 7/2009 | Arnold et al. | 714/16 |

OTHER PUBLICATIONS

McAllister "Complete Rules for N-ARY Relationship Cardinality Constraints", Data & Knowledge Engineering, vol. 27, No. 3, Oct. 1998, pp. 255-288.

Lotlikat et al., "Analyzing Policy Dependencies Using Historical Information", Proceedings of the 6th IEEE International Workshop on Policies for Distributed systems and Networks, Jun. 2005, pp. 79-88.

Hai-Bo et al., "Invalid Path Identification of Workflow", Computer Integrated Manufacturing Systems, vol. 12, No. 5, May 2006, pp. 692-296.

* cited by examiner

```
public class J2EEDomainValidator extends DomainValidator {
  protected UnitValidator unitValidator = new UnitValidator();
  protected WebModuleValidator webModuleValidator = new WebModuleValidator();

public void validate (IDeployValidationContext context,
        IDeployReporter reporter) throws ValidationException { for (Iterator iter = context.getAllUnits (J2eePackage.eINSTANCE);
                iter.hasNext();) {
      Unit unit = (Unit) iter.next();

switch (unit.getEObject().eClass().getClassifierID()) {
      case J2eePackage.WEB_MODULE:
        webModuleValidator.validate(unit, context, reporter);
        break;
      default:
        unitValidator.validate(unit, context, reporter);
      }
     }
    }
   }
```

FIG. 13A

```
<extension point="com.ibm.ccl.soa.deploy.core.resolutionGenerators">
    <resolutionGenerator
        id="DeployAttributeValueResolutionGenerator"
        name="Attribute value resolution generator"
        class=" resolution.DeployAttributeValueResolutionGenerator">
        <enablement>
            <instanceof
                value=" core.validator.status.IDeployAttributeValueStatus" />
        </enablement>
    </resolutionGenerator>
</extension>
```

```
public class WebModuleValidator extends UnitValidator {
    protected void validateServiceLink(ServiceLink link, Unit unit,
        IDeployValidationContext context, IDeployReporter reporter)
        throws ValidationException {
    super.validateServiceLink(link, unit, context, reporter);

if (link.getSource() instanceof J2EEDataSource) {
        DeployValidatorUtils.validateServiceLinkLocal(link, 1, context,
            reporter);

if (link.getTarget() instanceof J2EEDataSource) {
            DeployValidatorUtils.validServiceLinkServiceAttributeMatch(
                link, J2eePackage.eINSTANCE
                    .getJ2EEDataSource_JndiName(), context,
                reporter);
        }
    }
}
    protected void validateConsumedService(Service service, Unit unit,
        IDeployValidationContext context, IDeployReporter reporter)
        throws ValidationException {
    super.validateConsumedService(service, unit, context, reporter);

if (service instanceof J2EEDataSource) {
        J2EEDataSource ds = (J2EEDataSource) service;
        if (ds.getJndiName() == null) {
            reporter.addMessage(DeployCoreMessageUtil
                .createObjectAttributeUndefinedMarker(ds,
                    J2eePackage.eINSTANCE
                        .getJ2EEDataSource_JndiName()));
        }
    }
  }
 }
}
```

```
public class DeployAttributeValueResolutionGenerator extends DeployResolutionGenerator { public IDeployResolution[ ] getResolutions (IDeployResolutionContext context) {
        IDeployAttributeValueStatus status =
            (IDeployAttributeValueStatus) context.getDeployStatus ();
        return new IDeployResolution [ ] {
                new DeployAttributeValueResolution (status, context, this)
            };
    } public boolean hasResolutions (IDeployResolutionContext context) {
        IDeployAttributeValueStatus status =
            (IDeployAttributeValueStatus) context.getDeployStatus ();
        return ResolutionUtils.isSettable (status);
    }
}
```

FIG. 13D

```
public class DeployAttributeValueResolution extends DeployResolution { protected IDeployAttributeValueStatus aStatus;

public DeployAttributeValueResolution (IDeployAttributeValueStatus status,
        IDeployResolutionContext context, IDeployResolutionGenerator generator) {
    super (context, generator);
    this.aStatus = status;
    setDescription ("Set attribute " + aStatus.getAttributeName() + " to " + value);
    } public IStatus resolve (IProgressMonitor monitor) {
        try {
            DeployModelObject object = getDeployStatus () .getDeployObject ();
            EAttribute attribute = aStatus.getAttributeType ();
            Object value = aStatus.getAttributeExpectedValue ();
            object.getEObject () .eSet (attribute, value);
            return Status.OK_STATUS ;
        } catch (Throwable e) {
            return new Status (IStatus.ERROR , DeployCorePlugin.PLUGIN_ID , 0, e.getMessage () , e);
        }
    }
}
```

FIG. 13E

METHOD AND SYSTEM FOR MODELING, VALIDATING AND AUTOMATICALLY RESOLVING GOALS AND DEPENDENCIES BETWEEN ELEMENTS WITHIN A TOPOLOGY

BACKGROUND OF THE INVENTION

1. Field of the Invention

The present invention relates generally to the data processing field and, more particularly, to a computer implemented method, system and computer usable program code for configuring a computing system by identifying errors in a model of the computing system and for automatically resolving the identified errors 2. Description of the Related Art Enterprises today rely on Web-based applications to deliver critical services to their customers and partners. These Web-based applications are typically assembled from a set of communicating components hosted over distributed and heterogeneous platforms. Resources, organized in data centers, may be shared across applications, and, potentially, across customers.

Currently, the deployment and configuration of Web-based applications is an ad-hoc, human-intensive process which poses significant costs and risks to service owners. Configuration dependencies cut across software stacks, network layers, and middleware container boundaries. These interdependencies, which may require an operator to switch between servers, tools, and knowledge domains, govern the complexity of the configuration task. A deployed application must satisfy operational and business requirements such as connectivity and performance, use available resources, and follow data center policies and best practices such as security policies. Often, the same application must be deployed in multiple environments, such as development, staging, testing and production, with differing sets of requirements. Web-based applications also go through constant changes, and this further complicates the problem of deployment and configuration.

While software engineers enjoy a mature set of methodologies and tools to develop and test applications, operations personnel lack comprehensive solutions to deploy and manage distributed applications and must depend on manual processes involving custom scripts, low level commands, and a large, non-uniform set of tools to manage application life cycles.

The use of object-relationship models for the design and configuration of computer, network and software systems has been adopted in industry and their use is being standardized for service deployment models. Typically, such models are validated syntactically against a meta-model. Often, the models are also validated semantically against a set of validation rules. The results of such syntactic and semantic validations are then presented to users in a human-readable form, and the users must be able to understand any underlying errors in the model and take appropriate corrective action.

In some cases, the validation mechanism also contains information regarding actions that are required to correct an error. Automated systems have been developed to search through models using such validation mechanisms to derive a topology which satisfies all relevant constraints. Other systems use declarative constraints and constraint satisfaction algorithms to find a configuration which satisfies all constraints.

A key challenge in all approaches to resolving validation errors in models of computing systems is the complexity of the search space due to the existence of a large number of possible resolutions for each problem, and the interactions between possible resolutions. Resolutions available to correct errors may be specific to the contents of the model and organizational policies. An author of a validation rule typically will not know all the possible types of resolutions that may be applied when the rule is violated.

There is, accordingly, a need for a mechanism for configuring a computing system that includes a capability of identifying errors in a model of the computing system, determining possible resolutions to correct these errors, and presenting the possible resolutions for user choice or automated application.

SUMMARY OF THE INVENTION

Exemplary embodiments provide a computer implemented method, system and computer usable program code for configuring a computing system. A system for configuring a computing system includes a mechanism for creating a model of a computing system, a validator for determining whether there are any errors in the model, and a resolver, responsive to determining that there is at least one error in the model, for determining whether there is at least one resolution for correcting the at least one error. A selector, responsive to determining that there is at least one resolution for correcting the at least one error, selects at least one resolution among the at least one resolution for correcting the at least one error to form at least one selected resolution to correct the at least one error, and applies the at least one selected resolution to the model to form a transformed model. An output outputs the transformed model to a user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an exemplary embodiment when read in conjunction with the accompanying drawings, wherein:

FIGS. 13A-13E illustrate a simple validator for a J2EE domain extension according to an exemplary embodiment.

DETAILED DESCRIPTION OF THE PREFERRED EMBODIMENT

Figure 1:
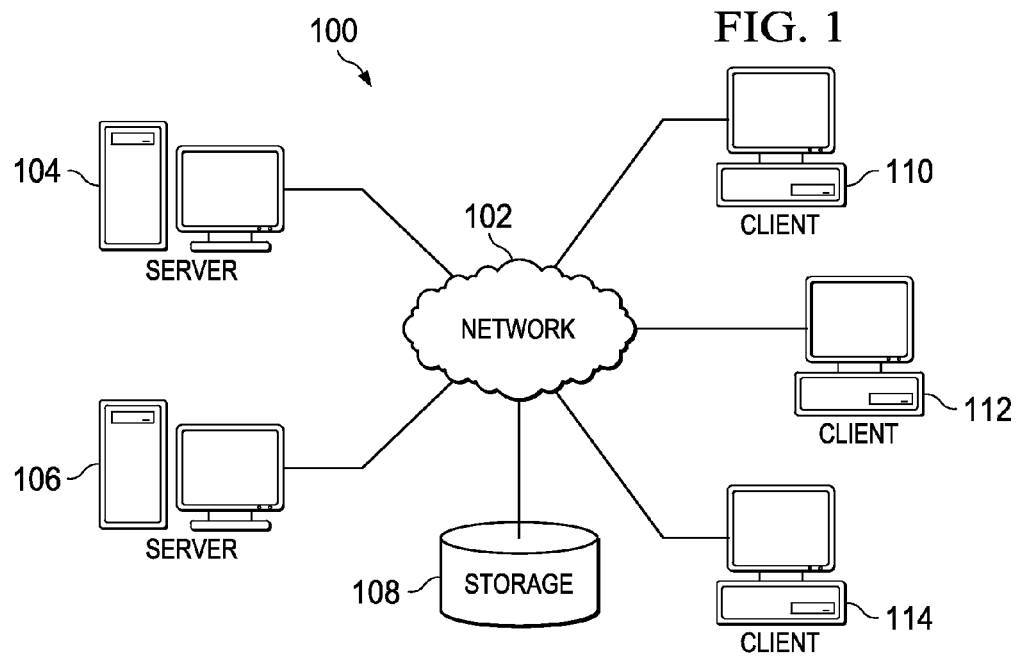
FIG. 1 depicts a pictorial representation of a network of data processing systems in which exemplary embodiments may be implemented.
Figure 2:
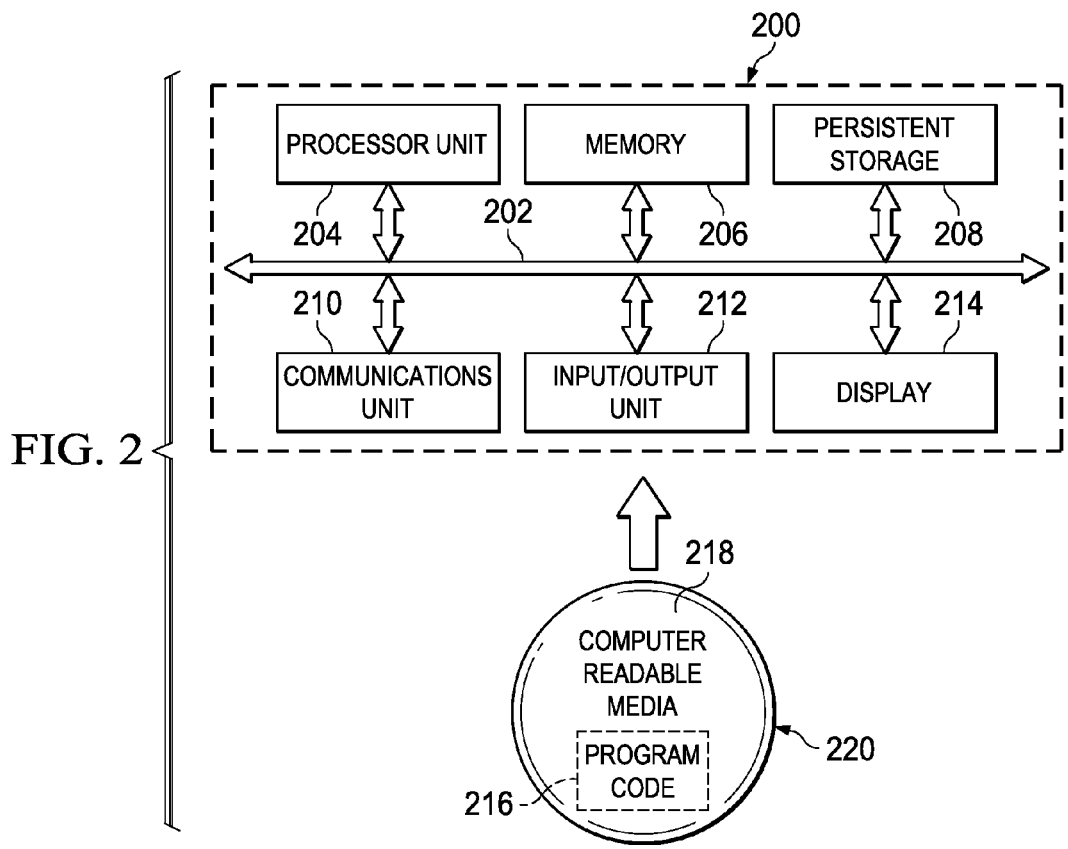
FIG. 2 illustrates a block diagram of a data processing system in which exemplary embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different exemplary embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Exemplary embodiments provide a computer implemented method, system, and computer usable program code for configuring a computing system. In the following description, resources of a computing system are sometimes referred to as units of a computing system, and every unit is of a particular type (e.g., WebsphereServerUnit, DataSourceUnit, WindowsOSUnit). Further, every unit is associated with a set of capabilities and requirements. Every capability contains set attribute-value pairs that describe the properties of the resource. Requirements can contain expressions that describe what is expected of the properties of other related resource.

Units, capabilities, and requirements can all be connected via relationships. There are three basic types of relationships: hosting, dependency, and membership. A hosting relationship connects two units. A hosting relationship is valid if all of the hosting requirements of the relationship's source are satisfied by the set of hosting capabilities of the relationship's target. A dependency relationship connects a single dependency requirement with a single capability. Dependency requirements indicate that a certain value of a property of a resource is derived from a property of another resource. Every dependency relationship is associated with logic to calculate the value of a derived property based on the properties of the resource that is the target of the dependency. Last, membership links define containment constraints (such as multiplicity) between group units and the set of elements that they contain.

In addition to the models, validation and resolution rules are associated with resource types. A validation rule defines further constraints that must hold on topologies that contain instances of the corresponding type. These constraints may go beyond the ones implied by the associated set of requirements. An example of a simple constraint on an attribute values is: "DB2 password must be 8 characters". The deployment planning framework triggers and evaluates the relevant validation rules for every change in the topology. Resolutions are associated with errors generated by validation rules evaluated to False. A resolution rule contains model transformation logic to fix an error. For example, a resolution for an unsatisfied unit's hosting requirement may search for a different unit with suitable hosting capabilities and connect the two via a hosting relationship. The deployment planning technology is extensible: new unit types can be defined and associated with capabilities and requirements. New validation and resolution rules can be added and associated with new or existing resources.

A mechanism for configuring computer systems according to exemplary embodiments allows users to construct topologies by: 1. discovering and representing existing resources in a data center as model elements (units and relationships). 2. Adding to the topology units representing new resources such as software modules to be installed, such as a data source, and connecting with relationships that indicate placement and dependencies. As will be explained more fully hereinafter, a controller executes all of the relevant validation rules following every model change. Units for which one or more validation rules fail are marked with error markers. Users can execute resolution rules that are associated with errors, if they exist. Resolution rules, once executed, change (transform) the model by adding or changing model elements, this change triggers another validation cycle. There is a flexible line between manual and automatic modes of topology constructions. Users can let the tool automatically execute a sequence of resolutions to get to a topology or sub topology that is fully resolved (no errors).

Figure 3:
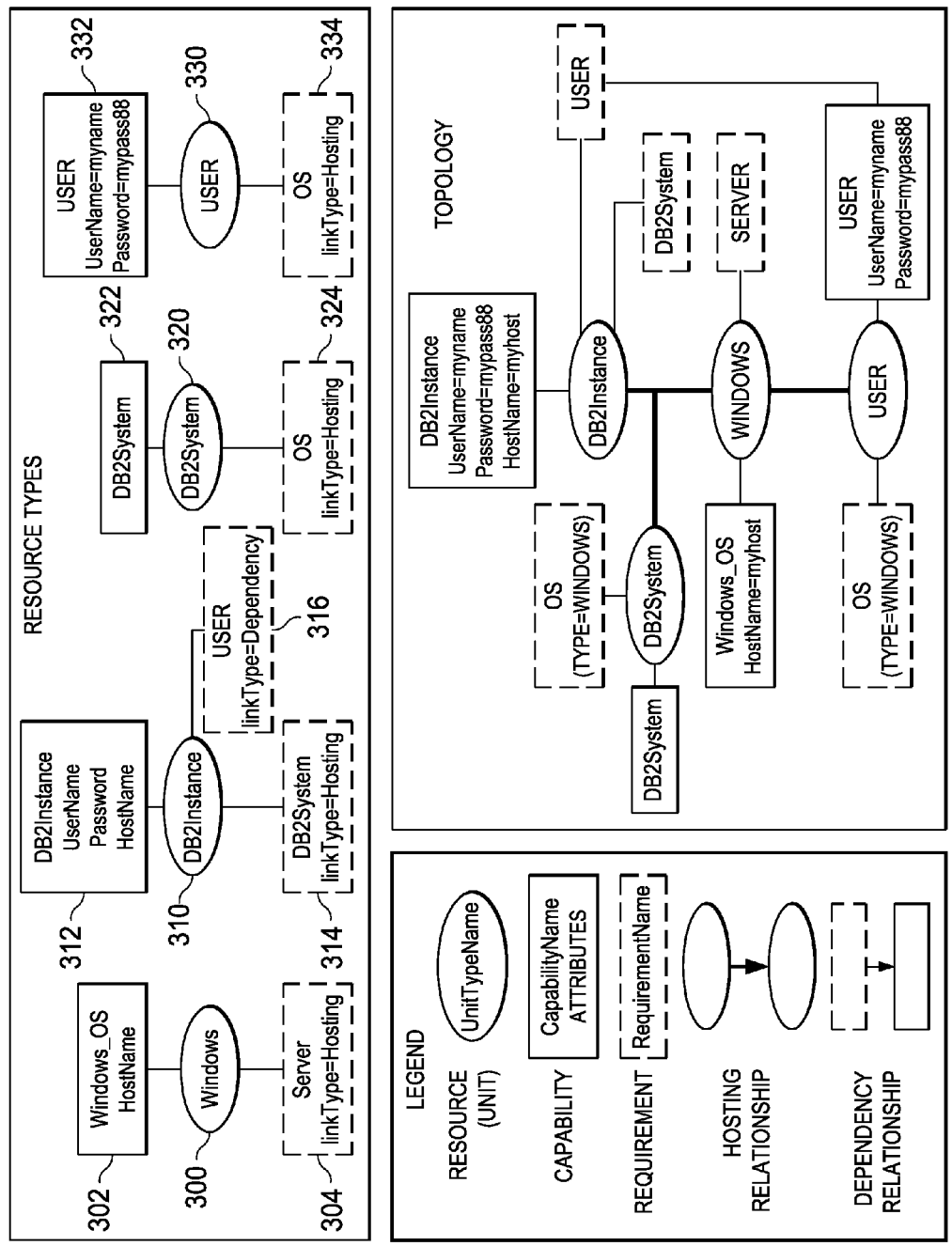
FIG. 3 illustrates a diagram showing different resource types and an associated set of capabilities and requirements to assist in explaining exemplary embodiments.

FIG. 3 illustrates a diagram showing different resource types (units) and an associated set of capabilities and requirements to assist in explaining exemplary embodiments. FIG. 3 illustrates four types of resources including Windows™ 300, DB2 Instance 310, DB2System 320 and User 330. Each resource type 300, 310, 320 and 330 is associated with a set of capabilities 302. 312, 322 and 332, respectively, and a set of requirements. In the example illustrated in FIG. 3, Windows resource type 300 includes requirement 304, DB2Instance resource type 310 includes requirements 314 and 316, DB2System resource type 320 includes requirement 324 and User resource type 330 includes requirement 334.

The capabilities contain definitions of attributes that are the properties of the respective resource types. Some of these attributes, such as user name and password on the Windows OS user, are configurable. With each resource type definition there could be associated validation and resolution rules. For example, a validation rule for the DB2Instance resource type is "password must be 8 characters". Another validation rule is that the name and password defined on the DB2Instance must match a User resource defined on the operating system that hosts the DB2Instance (recursively). An example of a resolution rule will propagate the value of the username and password attributes based on the dependency link from the DB2Instance to the User resource. If such dependency link does not exist, the resolution rule can prompt a topology designer for user name and password and based on these inputs automatically insert into the topology the user definition, the hosting link to the OS, and the dependency link from the DB2Instance, and propagate the values.

Another example of a validation rule is the constraint that the host name configured on the DB2Instance matches the host name defined on the operating system. Again, a resolution rule propagates the value of the host name by traversing hosting links in the topology.

In addition to the description above, a resource designer can raise the level of abstraction in constructing topologies based on higher level goals by defining configuration patterns. A configuration pattern is a statement of goal such as a communication goal, and model transformation logic to achieve this goal. For example, a resource designer can define a new type of constraint link between two existing resource types. Connecting instances of these types by a constraint link is a statement of a communication goal.

There are number of conditions that must be satisfied for a goal to be considered satisfied. These conditions may include, for example, configuration on the instances at the end of the link or configuration on software modules down the hosting stacks. The details of the required configuration may depend on the global state of the topology. Associated validation logic checks whether the goal is satisfied by the current topology, if not, an error marker is created. The resolution logic offers an automatic way to transform the topology such that the goal is satisfied. For example, based on the global state of the topology, the logic can decide to add units representing the necessary configuration to achieve the goal on both sides of the software stack.

The topology designer uses patterns to first express high level goals on a given set of elements in a topology, and second, to create topologies that include suitable configuration constructs to satisfy these goals. An example of such a pattern is a constraint link that expresses a communication requirement on a database. In this example, to enable the communication, the application server is configured with a Datasource, a J2CAuth, and a JDBCProvider. Dependencies exist between elements, for example, the Datasource must be configured with the name of the Database. This expresses itself as a capability on a Datasource with a derived DatabaseName attribute, and a dependency relationship to the Database Unit (with an associated propagation rule). In addition, if the Java 2 Enterprise Edition (J2EE) Enterprise Application Archive (EAR) and Database reside on two different operating systems then a DB2Client may be required on the operating system running the application server. Note that the pattern applies in both a case where the application server unit in the model represents an existing application server or if it represents an application server that needs to be installed and started. In the first case, the logic of the transformation may decide to reuse an existing configuration on the application server to achieve the configuration goal. The resolution rule, associated with the constraint link, examines the topology and adds to the topology the necessary software modules and configuration elements to satisfy the goal.

Figure 4:
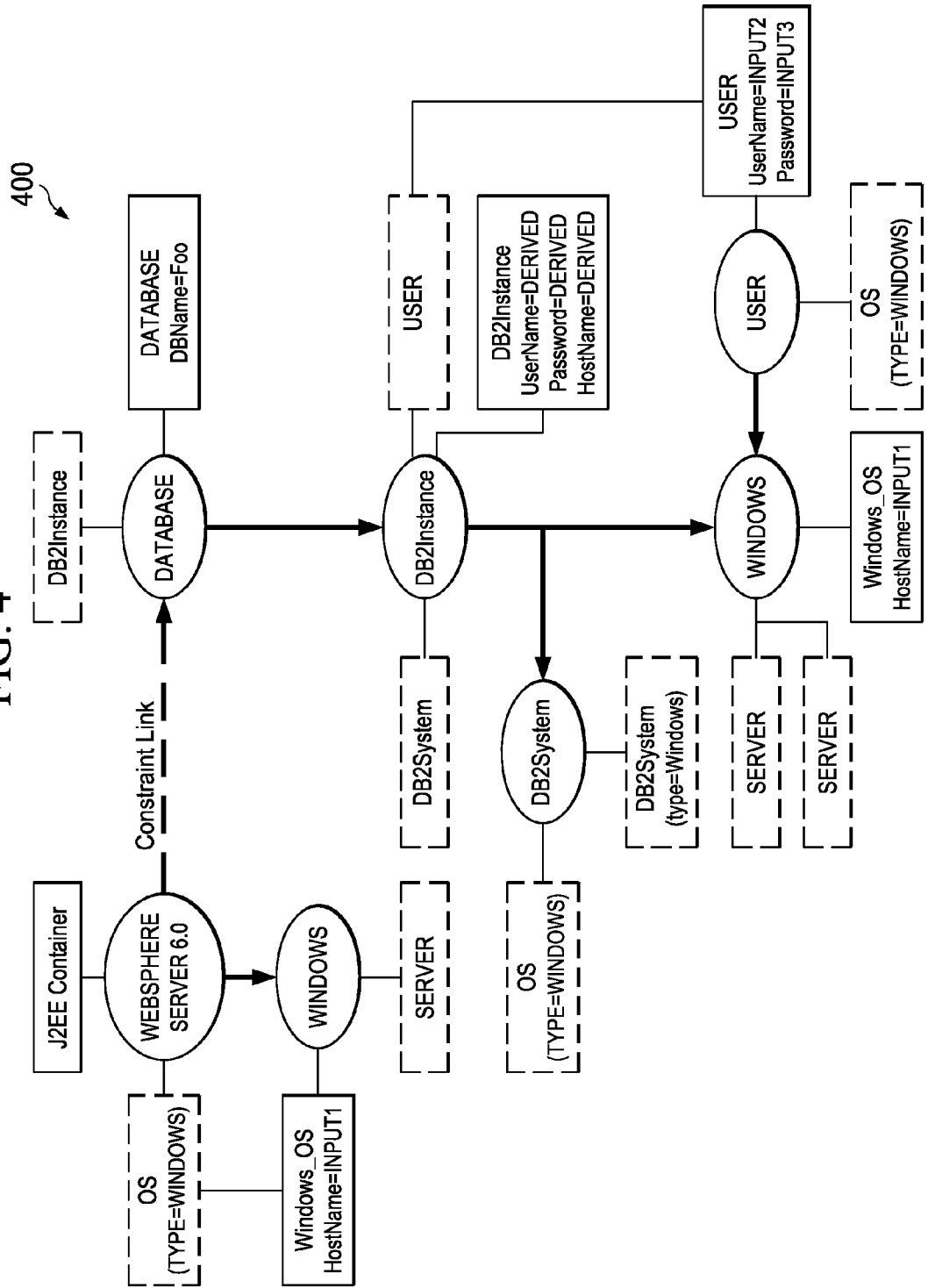
FIG. 4 and FIG. 5 are block diagrams that illustrate a logical link between different types of resources to assist in explaining exemplary embodiments.
Figure 5:
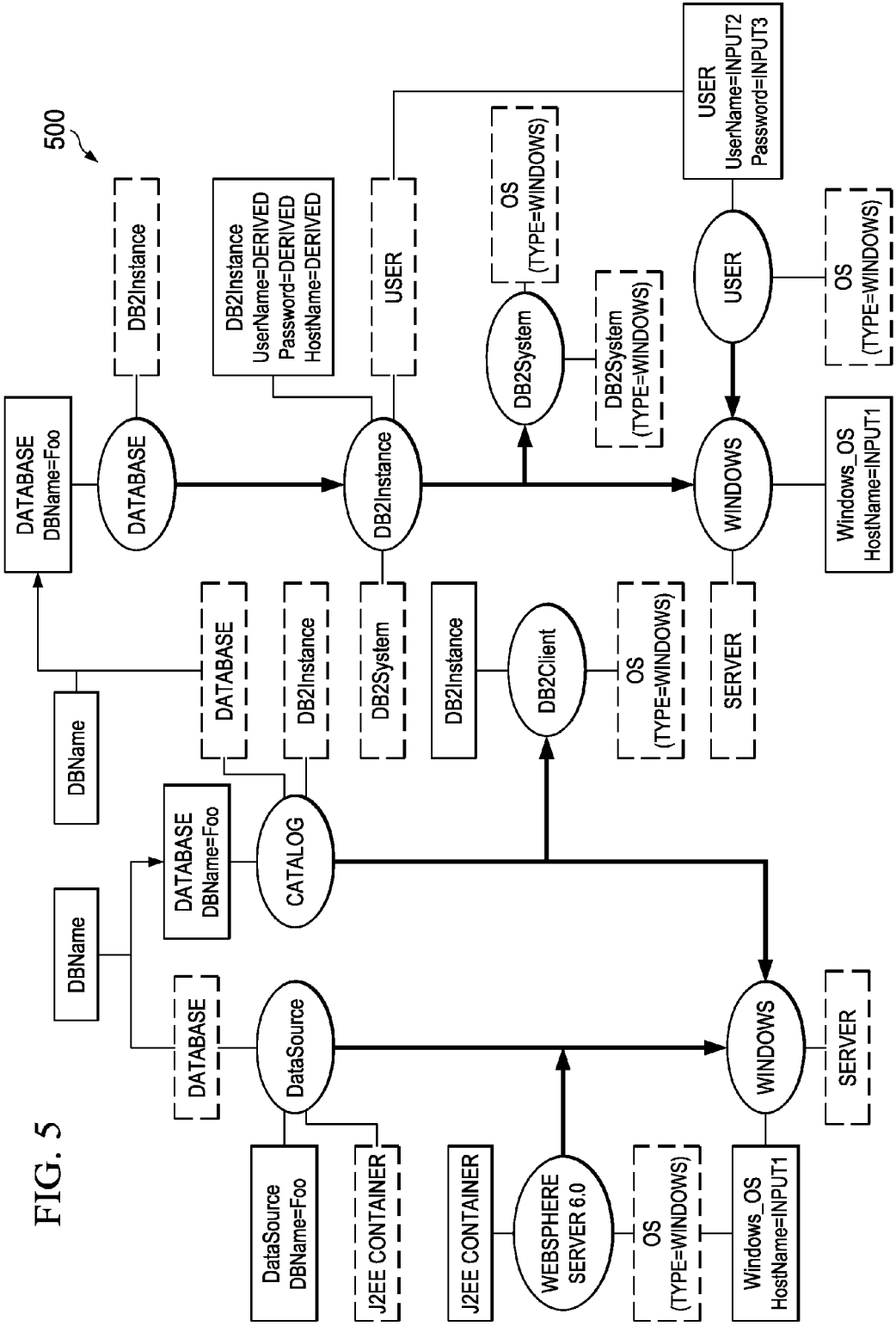

FIG. 4 and FIG. 5 are block diagrams that illustrate a constraint link between different types of resources to assist in explaining exemplary embodiments. More particularly, FIGS. 4 and 5 are block diagrams illustrating the constraint link described above. The illustration simplifies some of the configuration details, but leaves enough details to demonstrate the ideas. FIG. 4 shows a topology, generally designated by reference number 400 that includes a Websphere Server hosted on an operating system. The constraint link is defined between the Websphere Server resource type and the Database resource type. It expresses a communication goal between these resources. For the topology instance in FIG. 4, the goal is not met by the current state of the topology.

FIG. 5 shows a topology, generally designated by reference number 500, that is the result of executing a resolution associated with the constraint link (for simplicity the constraint link itself is not shown). This resolution adds to the topology the following elements: DB2Client, Database Catalog, and a Datasource. The respective hosting relationships were also created. Dependency links were also created and values of attributes are propagated respectively. For example, the value of DBName is propagated to the definition of the Catalog and the Datasource. Note that this topology describes now a configuration structure that enables communication between applications hosted on the Websphere Application Server to the Database.

The result of the planning phase is a fully valid topology where: (1) all of the requirements of units (hosting, dependency and membership) are satisfied, (2) all of the validation rules associated with units in the topology evaluate to True, (3) all of the validation rules associated with constraint links are evaluated to True.

In general, a fully valid deployment topology describes a configuration state that is functional and all of the high level goals expressed by the logical links are obtained. The topology is sufficiently detailed to serve as a blueprint and plan for provisioning automation. Provisioning technologies such as Tivoli™ Provisioning Manager, can consume this topology and automate provisioning, deployment and configuration of resources based on the topology. At the end of the process, the state of the data center matches what is described in the topology.

Constructing a topology can be done interactively by dragging and dropping definitions of resources, or description of resource instances (representing real resources in the data center); by drawing relationships between resources, by defining values of attributes, and by executing resolutions. Topologies can be also constructed in an automatic or a semi-automatic mode. A search algorithm can be used to execute all of the resolutions automatically. This approach can be used to fully resolve a topology or a sub-part of a topology (a set of selected resources). This search can present to the user choices where they exist, or just make a selection based on defaults if such a policy is defined, or alternatively create all possible topologies that satisfy all of the constraints and goals.

Exemplary embodiments support the specification of validation rules which produce errors which contain not only human-readable information, but also machine-readable information identifying the error(s) in the model. Such information may include, but is not limited to, the model context of the error, the validation rule ID, and the type of error. Additional information may include constraints on values chosen to resolve the error.

Exemplary embodiments also support specification of resolution rules that are bound to validation error attributes. Exemplary embodiments are able to validate models that represent existing or planned computer, network and software systems. For each validation error generated, exemplary embodiments can determine a set of resolutions that can resolve the error. The resolutions may then be presented to a user or to a computer which can select and apply the most appropriate resolution.

Figure 6:
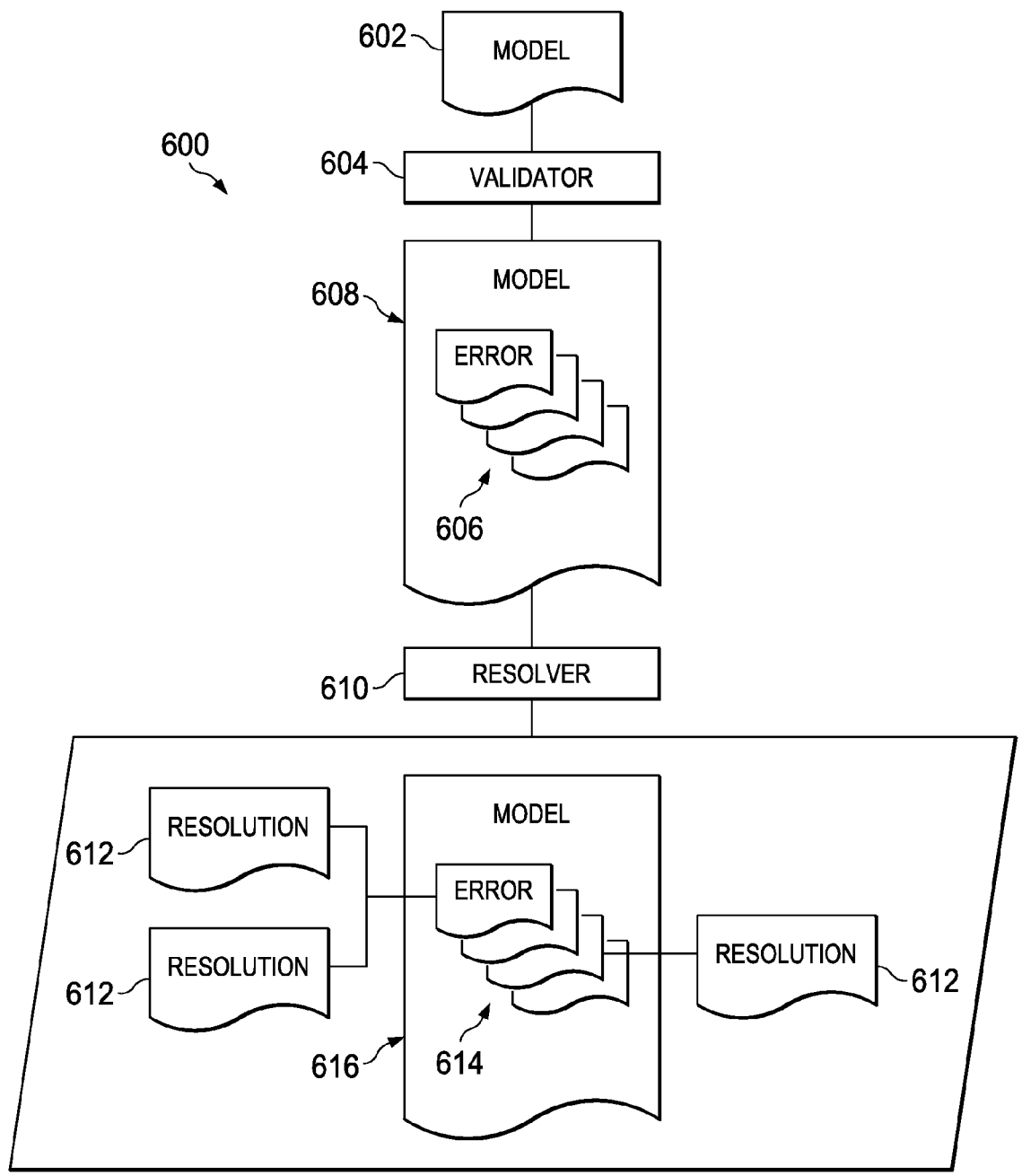
FIG. 6 illustrates a block diagram of a system for configuring a computing system according to an exemplary embodiment.

FIG. 6 illustrates a block diagram of a system for configuring a computing system according to an exemplary embodiment. The system is generally designated by reference number 600 and includes model 602 which depicts an existing or planned computing system, e.g., a computer, network or software system, and their relationships as an input. A validator 604 performs a validation process by applying all or a subset of validation rules on model 602. If any of the applied validation rules are violated, errors 606 are generated and are associated with model 602 as shown at 608. Errors 606 may be associated with model 608 by being added to model 602, or the errors may be stored in a separate document or repository and reference the model elements.

Errors 606 or a subset of errors 606, and model 608 are then examined by resolver 610. Resolver 610 performs a resolution process in which it consults a set of resolutions to identify which resolutions apply for each error 606, and then outputs a set of available resolutions 612 which are bound to specific ones of the errors as shown at 614. The set of available resolutions are also associated with the transformed model as shown at 616, and may be stored in the model, in the errors, or in a separate document or repository referencing the errors resolved.

Figure 7:
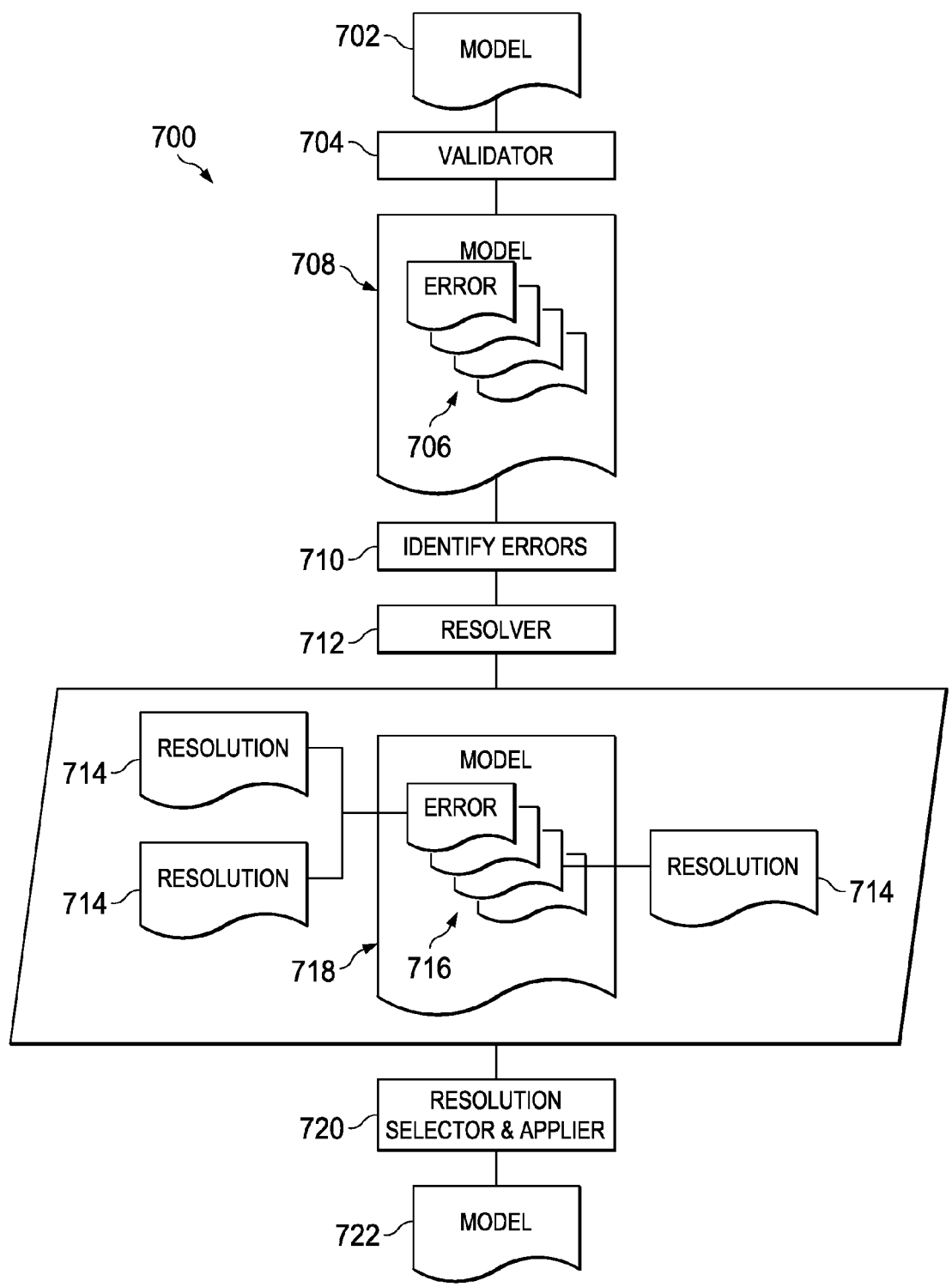
FIG. 7 illustrates a block diagram of a system for configuring a computing system according to a further exemplary embodiment.

FIG. 7 illustrates a block diagram of a system for configuring a computing system according to a further exemplary embodiment. In particular, FIG. 7 illustrates an extended configuration system according to an exemplary embodiment.

The system is generally designated by reference number 700, and as shown in FIG. 7, validator 704 performs a validation process on model 702 and finds errors 706 which are associated with the model as shown at 708. The errors are identified as shown at 710 and resolver 712 looks up resolutions for the identified errors. A human or computer process selects one or more of the identified resolutions to apply to the errors resulting in transformed model 718 having selected resolutions 714 associated with errors 716. Transformed model 718 may then be revalidated by repeating the validation and resolution operations until no more errors are found. The selected resolutions to resolve the errors are then applied by resolution selector and applier 720 to provide final transformed model 722. It should be noted that the definition of what constitutes an error may differ depending on the role under which the model is validated.

Figure 8:
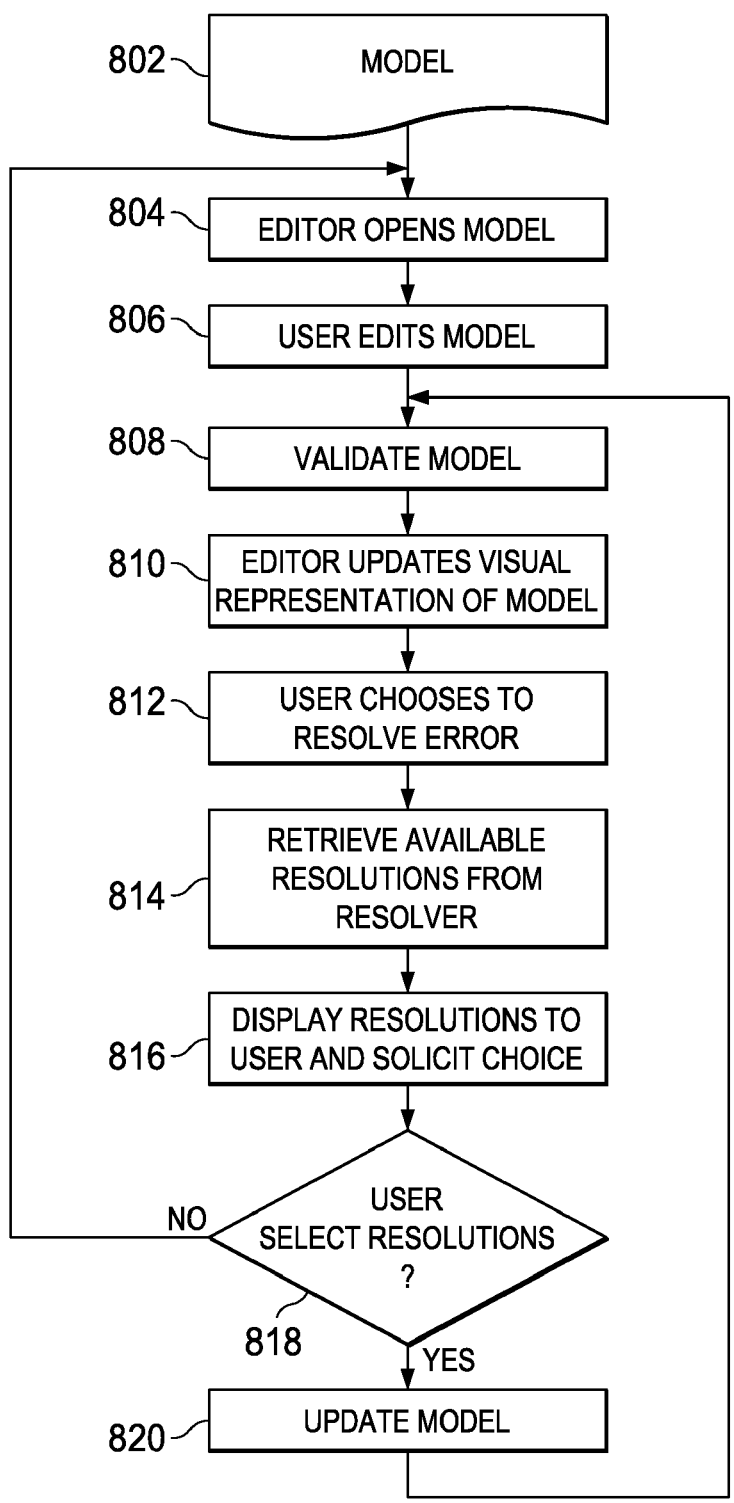
FIG. 8 is a flowchart that illustrates a method for configuring a computing system in a visual editor according to an exemplary embodiment.

FIG. 8 is a flowchart that illustrates a method for configuring a computing system in a visual editor according to an exemplary embodiment. The method is generally designated by reference number 800, and begins by a model 802 being opened in a deployment editor (Step 804). A user edits model 802 by interacting with the editor (Step 806). Upon a change in the model, a validator is invoked to validate either the whole model or a part of the model that was changed (Step 808). The output of the validation is a set of validation error messages associated with model elements.

The editor uses the output of validation to visually update a representation of the model, i.e., visual markers of errors (Step 810). In order to enhance the presentation of the visual markers, the editor may query the resolver to determine whether, for a given error status, there exists any resolutions. The user chooses to resolve one of the errors (Step 812), at which point the editor retrieves the specific resolutions available from the resolver (Step 814). The resolutions are displayed to the user and a selection is solicited from the user (Step 816), and the user determines whether to select one or more resolutions (Step 818). If the user determines not to apply any resolution (No output of Step 818), the process returns to step 804. If the user determines to apply one or more resolutions (Yes output of Step 818), the one or more resolutions are applied, triggering a updating of the model (Step 820) and the process returns to Step 808 to revalidate the updated model.

Figure 9:
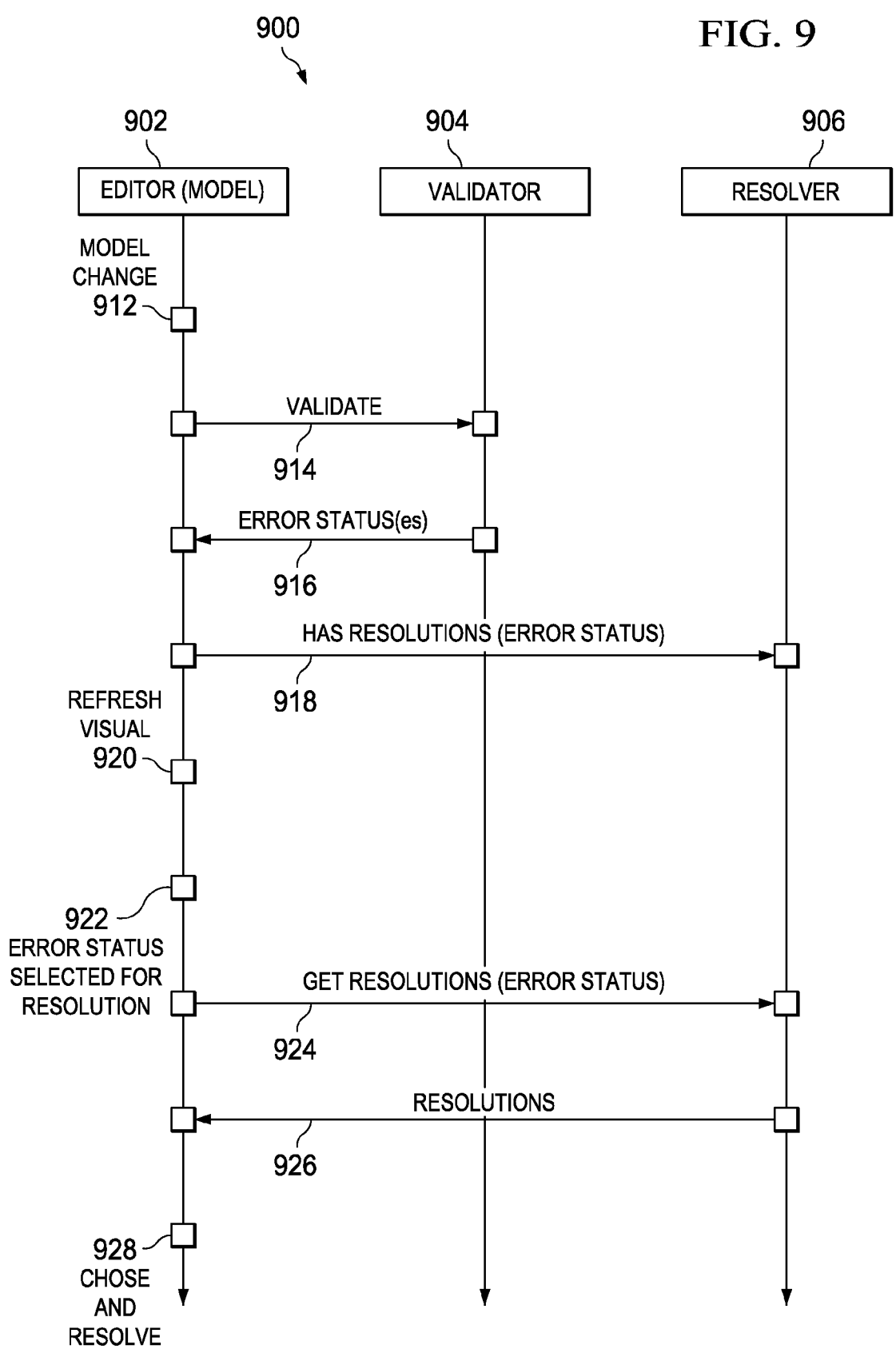
FIG. 9 illustrates a block diagram that depicts an asynchronous method for configuring a computing system according to an exemplary embodiment.

The validation and resolution process may be performed on separate threads of execution as depicted in FIG. 9. In particular, FIG. 9 illustrates an asynchronous method for configuring a computing system according to an exemplary embodiment.

In FIG. 9, model editor 902 displaying a model is notified of a model change 912 performed either through the editor or directly on the model. The model change triggers a validation process 914 on the model as a separate thread of execution as shown at 904. Upon completion of the validation process, the validation thread returns the error statuses (if any) to the editor as shown at 916. The editor either displays the statuses immediately, or queries the resolver 906 to find out if any of the error statuses has any resolutions as shown at 918. It then updates the visual representation accordingly as shown at 920.

Validation may occur in multiple threads of execution which update the model object statuses incrementally as they execute or complete. The resolution logic may be long running, and can trigger human activities such as physically moving a server.

A user or a process selects one or more resolutions as shown at 922. The editor obtains the specific resolutions for that error from resolver 906 as shown at 924 and 926. The resolution is then invoked either in the editor thread or in a separate execution thread (not shown) as shown at 928.

The deploy validation framework according to exemplary embodiments is responsible for identifying problems in a deployment topology and providing options on how the problems can be resolved. Problems may be associated with functional, as well as non-functional requirements. Resolutions, can address a single problem, or a set of problems. The validation framework is extensible in two dimensions. New domain type extensions can be bundled with their intrinsic functional requirements and resolutions. Existing domains can be extended by third-parties to include additional requirements and resolutions. Multiple resolutions may be defined for the same problem, and their presentation can be prioritized.

For a given topology, there are three sources of validation information. The XSD (XML Schema Definition) schema is a first source which constraints the types and values of the deployed model object attributes and relationships. Palette and unit providers are a second source of validation, in view of the fact they may constrain the capabilities that can be provided or consumed by a unit added to the topology. A third source of validation information is information contained in the validator's declared using the validation framework. The following describes details of how to express validation and resolution semantics in an SOA (Service Oriented Architecture) deployment tool, and how they are evaluated at runtime.

The entry-point to the SOA deployment tool validation framework, is a deploy validator service. This service delegates validation to domain-level validators. A domain validator operates over the complete topology and is not restricted on the types it may inspect or the order in which topology objects are visited. Common validation patterns, such as visiting all domain type instances and indexed queries over the topology are supported. No rigid structural requirements are imposed, however, to support alternative implementations, such as pattern-based and rule-based validators. The validate method accepts two parameters, a validation context used to access the topology and monitor progress, and a validation reporter used to declare problems.

Domain validators are declared using the validator element of the domain extension point. Every domain may be associated with zero or more validators. For a given topology, the deploy validator service will only invoke the domain validators for domains that have been instantiated in the topology. Eclipse platform enablement expressions may be used to enable or disable groups of domain validators for a given topology or deployment project. (Eclipse is an open source community whose projects are focused on providing an extensible development platform and application frameworks for building software.)

Domain validators report validation problems using a strongly typed message interface. Message interfaces constrain the types and semantics of problem attributes, through getters and setters. New ones can be defined, and existing ones can be extended using multiple inheritance. For example, an invalid attribute value may be declared in a deploy object problem structure which contains the deploy object instance, and the attribute type. A message may be further identified with a problem semantic type. For example, an invalid attribute message may be associated with problem semantic types such as attribute-undefined, attribute-invalid, attribute-length-invalid, etc. Messages must be serializable as a set of name-value string properties, so that they can be persisted in the Eclipse platform. Unlike markers, the in-memory representation is not constrained to primitive types, supporting easier use by validators.

The core domain validator defines a basic set of problem messages that will be discussed hereinafter. Extension domains may chose to define new problem types for existing message types, or define new or extended message types to support additional validation problem attributes.

Validation problem resolutions are created by resolution generators as per the Eclipse™ platform marker resolution pattern. The validation framework defines an extension point for resolution generators that will support more expressive patterns defined initially using Eclipse core expressions, but is also be extensible for other declarative expression languages, such as OCL. Multiple resolution generators may match a problem message. The validation framework is responsible for collating and prioritizing their generated resolutions.

A deploy problem resolution is invoked on a deploy problem message, and is passed a resolution context, and a progress monitor. A resolution may modify attributes of existing objects, create new objects (units, capabilities or links), and delete existing ones. All resolution operations occur in a transaction to support rollback in case of failure, undo/redo, and logging. An abstract resolution implementation can be used to write resolutions that don't want to manipulate their own transactions. Resolution information may be stored in the validation problem message. For example, if an attribute value is invalid, the validator may set the expected value (or values) attribute in the message. In such cases, generic resolutions may be written, since the resolution logic is placed in the validator.

Resolutions may need to be parameterized by the user. The resolution may predetermine a set of possible values for such a parameter. For example, a resolution to a hosting problem may require selection of a host by the user. Such resolutions may be associated with a graphical wizard to interact with the users. The resolution architecture isolates the mechanism for obtaining parameter values from the implementation of the resolution. In addition to accessing the topology, a resolution may need to query the environment for logical, installable, or existing resources. The resolution resource query layer provides an API for querying the different sources of information: topology, palette, navigator (providers).

The validation problem messages are associated with objects using the transient status attribute. When the topology is saved, the status attribute is not persisted with the topology. The save event triggers persistence of deploy problem messages as Eclipse platform markers. When a topology is opened in the editor, the markers are deserialized and added as status. The SOA deploy editor accesses problem markers in using the status property. This enables validation to be invoked over an in-memory topology that can be different than its persisted version. Resolutions are also performed over the deploy problem messages stored in the status. Problems not associated with a particular unit, capability, or link are added to the topology status. When resolution is invoked on a closed topology, its resolution deserializes the topology and markers in memory and invokes the resolution.

Figure 10:
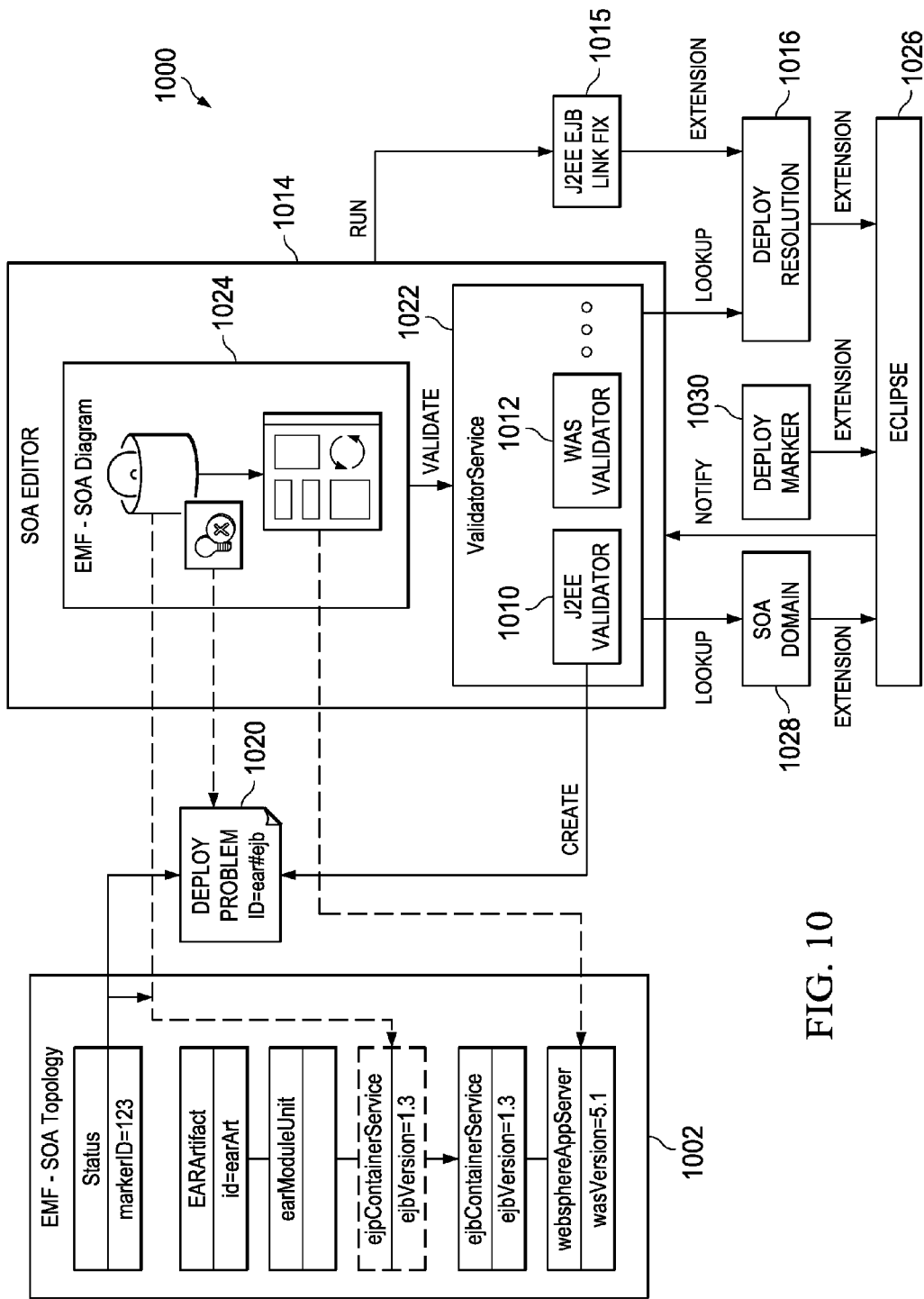
FIG. 10 is a diagram that schematically illustrates a validation framework architecture according to an exemplary embodiment.

FIG. 10 is a diagram that schematically illustrates a validation framework architecture according to an exemplary embodiment. The architecture is generally designated by reference number 1000, and a representation of a semantic topology model is shown at 1002. Validation and resolution is always performed against this semantic model. Deploy validators 1010, 1012 incorporated in validator service 1022 create messages that are attached as status on the topology itself or one of its contained objects as shown at 1020. Editor 1014 monitors for EMF status change events, and annotates the visual parts 1024 to indicate the existence of a problem, and its level (error, warning, information). The editor 1014 monitors mouse events on problem message markers 1030, and invokes matching resolution generators on the problem message. If the user selects a resolution, the selected resolution will be invoked as indicated at 1015 and 1016, modifying the topology 1002. The editor 1014 will examine the results of the resolution transaction to update the visual edit parts 1022. Eclipse platform enablement expressions, schematically shown at 1026 may be used to enable or disable groups of domain validators for a given topology as represented at 1028.

Figure 11:
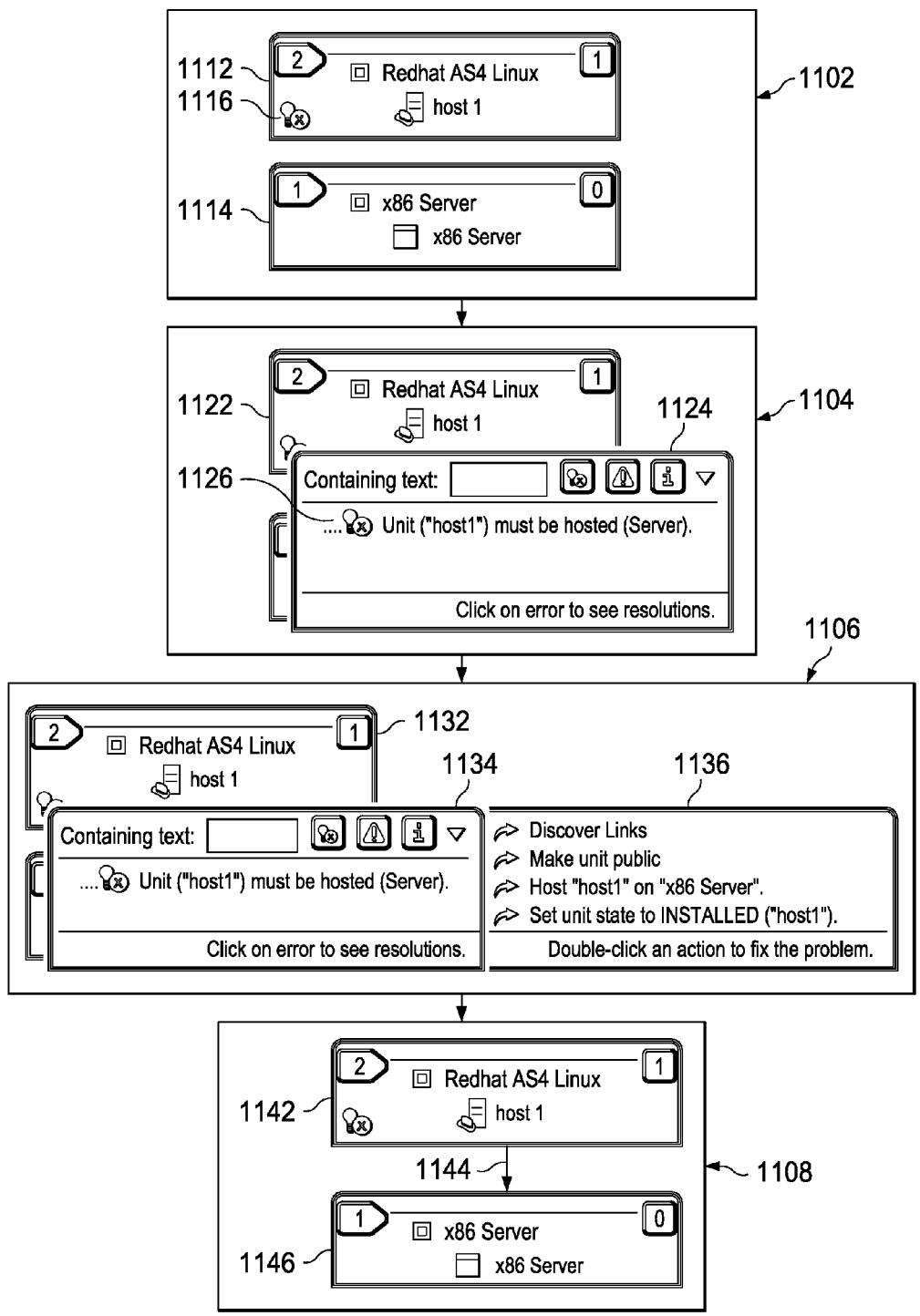
FIG. 11 is a diagram that depicts a visual representation of errors and resolutions according to an exemplary embodiment.

FIG. 11 is a diagram that depicts a visual representation of errors and resolutions according to an exemplary embodiment. More particularly, FIG. 11 depicts a visualization of a model 1102 after validation has been executed, an error status has been identified on unit 1112 and it has possible resolutions 1116. Note that unit 1114 has no statuses associated with it. In visual representation 1104, the user clicks on the error marker of unit 1122 and gets a list of errors 1124 associated with the unit and any objects it contains. In this example, a single error 1126 is listed identifying that the unit must be hosted.

In visual representation 1106, the user clicks on error message 1134 associated with unit 1132 and finds out a list of available resolutions 1136, at which point the user chooses to host unit 1132 on an "x86 Server".

After the resolution validation is reinvoked in visual representation 1108, unit 1142 is seen with no error message after the creation of the hosting link 1144 to unit 1146.

The core domain validator defines a hierarchy of deployment problem messages, and a validator for unit-level core semantic constraint validation. Although the core unit and capability types are not abstract, a typical topology will not include direct instantiations. Instead, it will contain instances of unit and capability subtypes. Hosting and dependency links will not be necessarily subtyped, however, their validation semantics will depend on their endpoints which will be unit and capability subtypes. The core domain validator implementation follows a unit visitor pattern. The validator iterates over direct instances of the core unit type (not instances of subtypes) and validates the following properties:

All topology level names are valid and unique.
Unit capabilities have valid and unique names.
Unit provided capabilities are not sources of a dependency link.
Unit consumed non-hosting capabilities are sources of a dependency link.

Unit consumed hosting capabilities are not sources of a dependency link.

Unit consumed capabilities are linked to provided capabilities whose type is a subtype of the consumed capability type.

Unit contained unit names are valid and unique.

Units with consumed hosting capabilities are the target of exactly one hosting link.

Units with no consumed hosting capability are not the target of any hosting link.

Units with no provided hosting capabilities are not the source of a hosting link.

Hosting link sources (hosts) provide all the capability types consumed by the link target (hosted).

The UnitValidator class provides methods for validating each provided non-hosting, provided hosting, consumed not-hosting, consumed hosting, dependency link, hosting link, and contained unit. Subtypes may override any method. Additional finer grained methods are provided for validating individual capability or unit properties.

Figure 12:
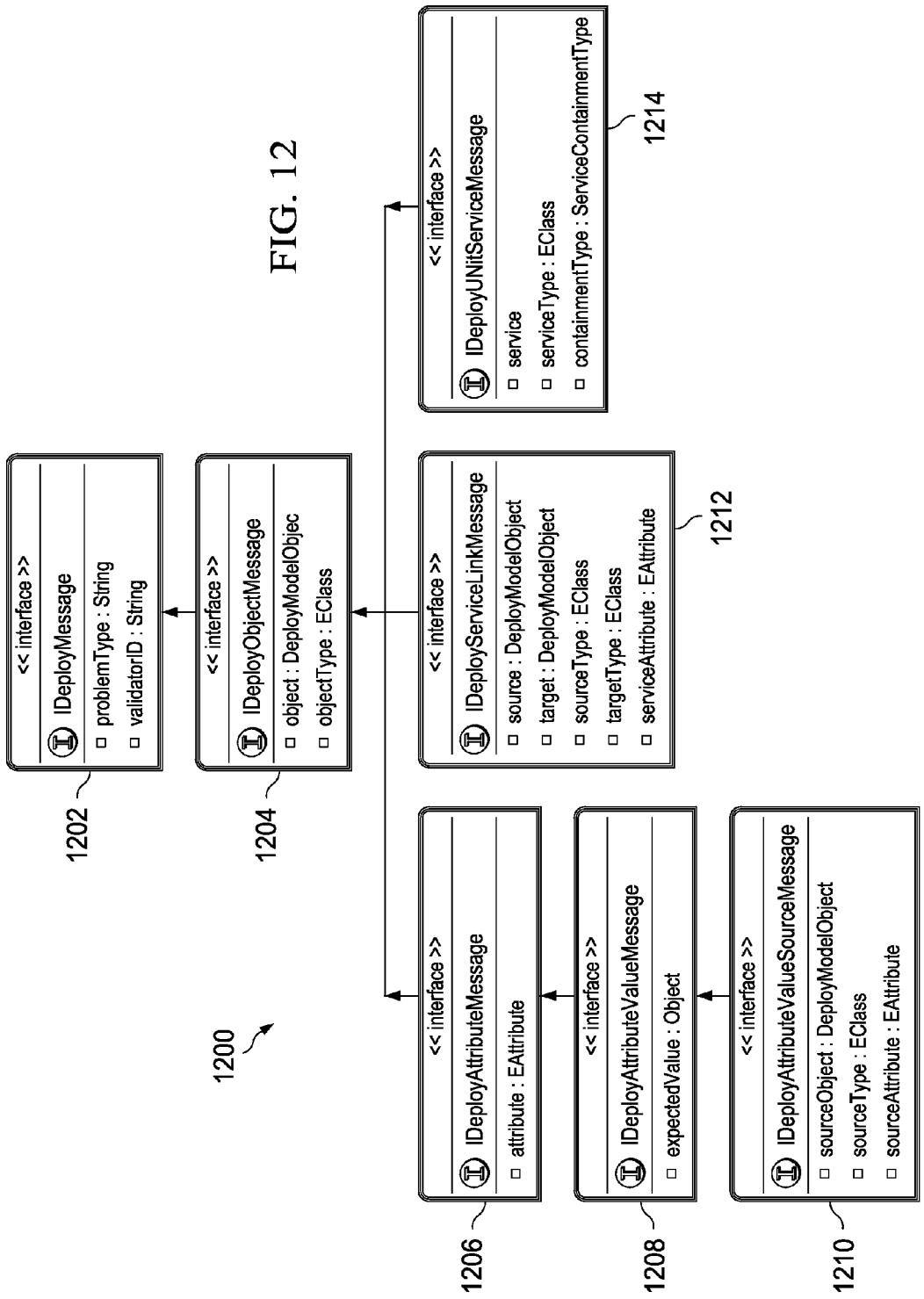
FIG. 12 illustrates a basic validation problem message hierarchy provided by a validator according to an exemplary embodiment.

The core validator also provides a basic validation problem message hierarchy. In particular, FIG. 12 illustrates a basic validation problem message hierarchy provided by a core validator according to an exemplary embodiment. The hierarchy is generally designated by reference number 1200. Base message 1202 has two properties identifying the problem type and the ID of the validator that created it. The base message is not associated with a particular object. It is extended by the object message which identifies a specific deploy object and its type as shown at 1204. The attribute message 1206 further identifies an attribute in the object. Its subtype, the attribute value message 1208 provides an expected value, and the source subtype 1210 identifies the object that was the source of that value. Messages can also be associated on links, defining the source and target objects and their types as shown at 1212, as well as capability-unit combinations 1214.

core validator defines problem types for the errors it checks for, as well as useful problem types that can be shared by extension domain validators. These are defined in an ICoreProblemType interface.

FIGS. 13A-13E illustrate a simple validator for the J2EE domain extension according to an exemplary embodiment. The validator uses a unit-visitor pattern. The validator implementation class (see FIG. 13A), will be declared in the class attribute of the validator element child of the domain Eclipse extension element. The implementation extends the abstract DomainValidator class. The validate method iterates over all units of the domain found in the topology. For each unit, based on its type it will either invoke a custom unit validator, or default to the core domain unit validator.

The WebModule unit validator implementation (FIG. 13B) will extend the UnitValidator class, and override the relevant methods (this is not a complete example, just a sample). Resolution generators are declared using an Eclipse extension point. FIG. 13C shows the relevant portion from the Eclipse plugin.xml file which registers a resolution generator for a message associated with a deploy object attribute, and which contains the expected value of that attribute. FIG. 13D shows one way to encode a resolution generator in the Java programming language, implementing the interface required by the extension point. Given a validation message status the generator returns a collection of available resolutions. In this example, the generator supports only one type of resolution. FIG. 13E shows one way to encode a resolution in Java by implementing the appropriate interface to check if the resolution applies, and applying the resolution.

Figure 14:
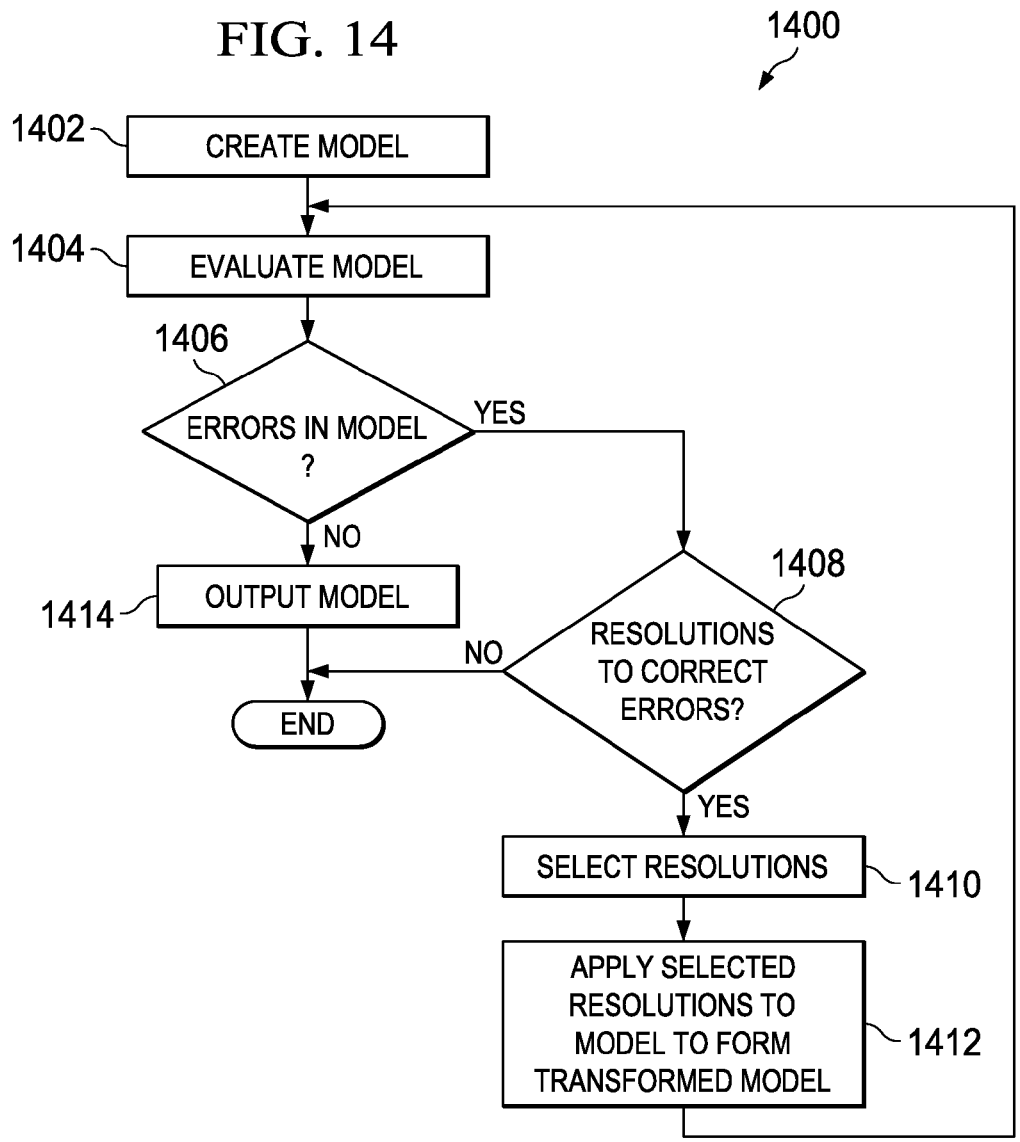
FIG. 14 is a flowchart that illustrates a method for configuring a computing system according to an exemplary embodiment.

FIG. 14 is a flowchart that illustrates a method for configuring a computing system according to an exemplary embodiment. The method is generally designated by reference number 1400, and begins by creating a model of a computing system (Step 1402). The model may comprise a complete system, a subunit of a system or a collection of systems. The model is then evaluated (Step 1404), and a determination is made whether there are any errors in the model (Step 1406). If it is determined that there at least one error in the model (Yes output of Step 1406), a determination is made whether there is at least one resolution for correcting the at least one error (Step 1408). If it is determined that there is at least one resolution for correcting the at least one error (Yes output of Step 1408), at least one resolution among the at least one resolution for correcting the at least one error is selected to correct the at least one error (Step 1410), and the at least one selected resolution is applied to the model to form a transformed model (Step 1412). Resolutions may be selected by a user or by the configuring system.

The method then returns to Step 1404 to evaluate the transformed model, and steps 1404-1412 are repeated for the transformed model. The method continues until it is determined that a model has no errors (No output of Step 1406). When no errors are found, the correct model (either the originally created model or a transformed model) is output to a user (Step 1414) and the method ends.

Returning to Step 1408, if it is determined that there are no resolutions for correcting the at least one error (No output of Step 1408), the method ends.

Exemplary embodiments thus provide a computer implemented method, system and computer usable program code for configuring a computing system. A system for configuring a computing system includes a mechanism for creating a model of a computing system, a validator for determining whether there are any errors in the model, and a resolver, responsive to determining that there is at least one error in the model, for determining whether there is at least one resolution for correcting the at least one error. A selector, responsive to determining that there is at least one resolution for correcting the at least one error, selects at least one resolution among the at least one resolution for correcting the at least one error to form at least one selected resolution to correct the at least one error, and applies the at least one selected resolution to the model to form a transformed model. An output outputs the transformed model to a user.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for configuring a computing system, comprising:
    a display for displaying a model of the computing system in a visual model editor;
    a mechanism for changing the model;
    a validator for, responsive to changing the model, determining whether there are any errors in the model;
    a resolver, responsive to determining that there is at least one error in the model, for updating a visual representation of the model by marking a unit associated with the at least one error with an error marker and determining whether there is at least one resolution for correcting the at least one error;
    a selector, responsive to determining that there is at least one resolution for correcting the at least one error, for:
        receiving an indication to resolve the at least one error;
        responsive to receiving the indication to resolve the at least one error, displaying, by the display, the at least one resolution and soliciting a selection of the at least one resolution;
        responsive to receiving an indication not to select any of the at least one resolution, re-displaying, by the display, the model of the computing system in the visual model editor;
        responsive to receiving an indication to select one or more of the at least one resolution:
            selecting the one or more of the at least one resolution; and
            responsive to selecting the one or more of the at least one resolution, applying the selected one or more of the at least one resolution to the model and transforming the model to form a transformed model, wherein transforming the model comprises executing resolution rules to add new model elements, and wherein the resolution rules contain model transformation logic to fix the at least one error, and wherein the resolution rules comprise new resolution rules that are associated with the new model elements; and
    an output for outputting the transformed model to the visual model editor.

2. The system of claim 1, wherein the mechanism for transforming the model comprises a mechanism for identifying relationships among resources in the model.

3. The system of claim 2, wherein the mechanism for identifying relationships among resources in the model, identifies at least one of hosting requirements between two resources in the model, dependency requirements between resources in the model, and membership links defining constraints between resources.

4. The system of claim 1, wherein the validator validates the model in accordance with validation rules which define constraints on the model to identify any errors in the model.

5. The system of claim 4, wherein the validator validates the model in accordance with validation rules by validating the model in separate threads of execution of the model.

6. The system of claim 1, wherein the selector comprises a configuring system.

7. The system of claim 1, wherein the output, responsive to determining that there are no errors in the model, outputs the model to a user.

8. The system of claim 1, wherein the computing system comprises one of a complete computing system, a subunit of the computing system and a collection of computing systems.

9. The system of claim 1, wherein displaying the at least one resolution comprises defining multiple resolutions for the at least one error and prioritizing a presentation of the multiple resolutions.

10. The system of claim 1, wherein the model transformation logic triggers a human activity.

11. The system of claim 10, wherein the human activity comprises physically moving a server.

12. A computer program product, comprising:
    a non-transitory computer recordable medium having computer executable program code for configuring a computing system, the computer program product comprising:
    computer executable program code for displaying a model of the computing system in a visual model editor;
    computer executable program code for changing the model;
    computer executable program code for responsive to changing the model, determining whether there are any errors in the model;
    computer executable program code, responsive to determining that there is at least one error in the model, for updating a visual representation of the model by marking a unit associated with the at least one error with an error marker and determining whether there is at least one resolution for correcting the at least one error;
    computer executable program code, responsive to determining that there is at least one resolution for correcting the at least one error, for receiving an indication to resolve the at least one error;
    computer executable program code, responsive to receiving the indication to resolve the at least one error, for displaying the at least one resolution and soliciting a selection of the at least one resolution;
    computer executable program code, responsive to receiving an indication not to select any of the at least one resolution, for re-displaying the model of the computing system in the visual model editor;

computer executable program code, responsive to receiving an indication to select one or more of the at least one resolution, for:
    selecting the one or more of the at least one resolution; and
    responsive to selecting the one or more of the at least one resolution, applying the selected one or more of the at least one resolution to the model and transforming the model to form a transformed model, wherein transforming the model comprises executing resolution rules to add new model elements, and wherein the resolution rules contain model transformation logic to fix the at least one error, and wherein the resolution rules comprise new resolution rules that are associated with the new model elements; and
    computer executable program code for outputting the transformed model to the visual model editor.

13. The computer program product of claim 12, wherein the computer executable program code for transforming the model includes computer executable program code for identifying relationships among resources in the model.

14. The computer program product of claim 13, wherein the computer executable program code for identifying relationships among resources in the model, comprises:
    computer executable program code for identifying at least one of hosting requirements between two resources in the model, dependency requirements between resources in the model, and membership links defining constraints between resources.

15. The computer program product of claim 12, wherein the computer executable program code for determining whether there are any errors in the model comprises:
    computer executable program code for validating the model in accordance with validation rules which define constraints on the model to identify any errors in the model.

16. The computer program product of claim 15, wherein the computer executable program code for validating the model in accordance with validation rules comprises:
    computer executable program code for validating the model in separate threads of execution of the model.

17. The computer program product of claim 12, wherein the computer executable program code for determining whether to select one or more of the at least one resolution comprises computer executable program code for determining, by one of a user and a configuring system, whether to select one or more of the at least one resolution.

18. The computer program product of claim 12, and further comprising:
    computer executable program code for repeating the displaying, changing, determining, updating, choosing, selecting, executing, outputting and applying steps with respect to the transformed model.

19. The computer program product of claim 12, and further comprising:
    computer executable program code, responsive to determining that there are no errors in the model, for outputting the model to a user.

20. The computer program product of claim 12, wherein the computing system comprises one of a complete computing system, a subunit of the computing system and a collection of computing systems.

* * * * *